United States Patent
Aoki

(10) Patent No.: US 12,428,049 B2
(45) Date of Patent: Sep. 30, 2025

(54) STEERING CONTROL DEVICE, STEERING CONTROL METHOD, AND COMPUTER PROGRAM PRODUCT

(71) Applicant: DENSO CORPORATION, Kariya (JP)

(72) Inventor: Takashi Aoki, Kariya (JP)

(73) Assignee: DENSO CORPORATION, Kariya (JP)

( * ) Notice: Subject to any disclaimer, the term of this patent is extended or adjusted under 35 U.S.C. 154(b) by 227 days.

(21) Appl. No.: 18/302,650

(22) Filed: Apr. 18, 2023

(65) Prior Publication Data

US 2023/0257020 A1    Aug. 17, 2023

Related U.S. Application Data

(63) Continuation of application No. PCT/JP2021/033316, filed on Sep. 10, 2021.

(30) Foreign Application Priority Data

Oct. 23, 2020   (JP) .................. 2020-178238

(51) Int. Cl.
*B62D 5/04* (2006.01)
*B62D 6/00* (2006.01)
*B62D 15/02* (2006.01)

(52) U.S. Cl.
CPC ........... *B62D 5/046* (2013.01); *B62D 5/0481* (2013.01); *B62D 6/008* (2013.01); *B62D 15/0205* (2013.01); *B62D 15/025* (2013.01)

(58) Field of Classification Search
None
See application file for complete search history.

(56) References Cited

U.S. PATENT DOCUMENTS

| | | | | |
|---|---|---|---|---|
| 4,914,382 A | * | 4/1990 | Douville | G01R 15/06 |
| | | | | 324/102 |
| 9,499,193 B2 | * | 11/2016 | Kageyama | B62D 5/046 |
| 9,533,705 B2 | * | 1/2017 | Tamura | B62D 6/04 |
| 9,545,949 B2 | * | 1/2017 | Yamazaki | B62D 5/0466 |
| 9,994,249 B2 | * | 6/2018 | Kageyama | B62D 5/001 |
| 10,202,146 B2 | * | 2/2019 | Endo | B62D 5/0463 |

(Continued)

FOREIGN PATENT DOCUMENTS

| | | | | |
|---|---|---|---|---|
| CN | 106849823 A | * | 6/2017 | B60L 15/20 |
| CN | 109204446 A | * | 1/2019 | B62D 5/0466 |

(Continued)

*Primary Examiner* — Kevin R Steckbauer
(74) *Attorney, Agent, or Firm* — Maschoff Brennan

(57) ABSTRACT

A steering control device includes a steering control unit configured to control an actual steering angle of the steering member by controlling a steering output torque output from the steering actuator, and a turning control unit configured to control an actual turning angle of the turning tire by controlling a turning output torque output from the turning actuator. The turning control unit is configured to perform a gradual reduction control to gradually decrease the turning output torque during a linked control in which the steering control unit controls the actual steering angle in conjunction with the actual turning angle in response to a stop instruction. The turning control unit and the steering control unit are configured to cut energization to the turning actuator and the steering actuator after the gradual reduction control.

13 Claims, 6 Drawing Sheets

(56) References Cited

U.S. PATENT DOCUMENTS

| | | | |
|---|---|---|---|
| 10,526,010 B2* | 1/2020 | Tsubaki | B62D 5/0409 |
| 10,562,566 B2* | 2/2020 | Kim | B62D 6/008 |
| 11,851,117 B2* | 12/2023 | Aoki | B62D 15/025 |
| 11,964,713 B2* | 4/2024 | Mori | B62D 6/002 |
| 12,049,263 B2* | 7/2024 | Kodera | B62D 6/002 |
| 2008/0059026 A1* | 3/2008 | Akiyama | B62D 5/0472 |
| | | | 701/41 |
| 2010/0228440 A1* | 9/2010 | Yamazaki | B62D 6/008 |
| | | | 701/41 |
| 2015/0025745 A1* | 1/2015 | Tamura | B62D 6/00 |
| | | | 701/41 |
| 2017/0015351 A1* | 1/2017 | Endo | B62D 6/00 |
| 2018/0154936 A1* | 6/2018 | Yamasaki | B62D 15/0285 |
| 2019/0002022 A1* | 1/2019 | Kim | B62D 5/0466 |
| 2019/0337559 A1* | 11/2019 | Tsubaki | H02P 29/64 |
| 2020/0207406 A1 | 7/2020 | Endoh et al. | |
| 2022/0315103 A1* | 10/2022 | Mori | B62D 5/0463 |
| 2022/0340195 A1* | 10/2022 | Sakayori | B62D 15/021 |
| 2022/0348253 A1* | 11/2022 | Aoki | B62D 15/025 |
| 2023/0026554 A1* | 1/2023 | Kodera | B62D 6/002 |
| 2023/0257020 A1* | 8/2023 | Aoki | B62D 5/046 |
| | | | 701/41 |
| 2024/0286673 A1* | 8/2024 | Kamimae | B62D 6/008 |
| 2025/0002076 A1* | 1/2025 | Endo | B62D 5/0469 |
| 2025/0153768 A1* | 5/2025 | Kodera | B62D 6/008 |

FOREIGN PATENT DOCUMENTS

| | | | | | |
|---|---|---|---|---|---|
| CN | 106849823 | B | * | 8/2019 | H02P 27/06 |
| CN | 109204446 | B | * | 3/2021 | B62D 5/0463 |
| EP | 2213546 | A1 | * | 8/2010 | B62D 15/0285 |
| EP | 2213546 | B1 | * | 8/2014 | B62D 1/28 |
| JP | 2008-238943 | A | | 10/2008 | |
| JP | WO2009069196 | A1 | * | 4/2011 | B62D 15/0285 |
| JP | 5068327 | B2 | * | 11/2012 | B62D 15/0285 |
| JP | 2014184739 | A | * | 10/2014 | |
| JP | 2018090057 | A | * | 6/2018 | |
| JP | 2019-098810 | A | | 6/2019 | |
| JP | 2019127216 | A | * | 8/2019 | |
| JP | 2020108327 | A | * | 7/2020 | |
| JP | 2022069191 | A | * | 5/2022 | B62D 5/0481 |
| JP | 7388335 | B2 | * | 11/2023 | B62D 5/0481 |
| KR | 20100074305 | A | * | 7/2010 | B62D 5/0463 |
| KR | 101156899 | B1 | * | 6/2012 | B62D 5/0463 |
| KR | 102224996 | B1 | * | 3/2021 | B62D 6/10 |
| WO | WO-2018047846 | A1 | * | 3/2018 | B62D 5/04 |
| WO | WO-2018088433 | A1 | * | 5/2018 | B62D 5/0496 |
| WO | WO-2022085331 | A1 | * | 4/2022 | B62D 5/0481 |

* cited by examiner

US 12,428,049 B2

STEERING CONTROL DEVICE, STEERING CONTROL METHOD, AND COMPUTER PROGRAM PRODUCT

CROSS REFERENCE TO RELATED APPLICATION

The present application is a continuation application of International Patent Application No. PCT/JP2021/033316 filed on Sep. 10, 2021, which designated the U.S. and claims the benefit of priority from Japanese Patent Application No. 2020-178238 filed on Oct. 23, 2020. The entire disclosures of all of the above applications are incorporated herein by reference.

TECHNICAL FIELD

The present disclosure relates to steering control technology in vehicles.

BACKGROUND

In recent years, techniques for electrically controlling the steering angle of a steering member of a vehicle and the turning angle of a turning tire have become widespread.

SUMMARY

A first aspect of the present disclosure is a steering control device of a vehicle for controlling and linking a movement of a steering member by a steering actuator with a movement of a turning tire by a turning actuator. The steering control device includes: a steering control unit configured to control an actual steering angle of the steering member by controlling a steering output torque output from the steering actuator; and a turning control unit configured to control an actual turning angle of the turning tire by controlling a turning output torque output from the turning actuator. The turning control unit is configured to perform a gradual reduction control to gradually decrease the turning output torque during a linked control in which the steering control unit controls the actual steering angle in conjunction with the actual turning angle in response to a stop instruction of the vehicle. The turning control unit is configured to cut an energization to the turning actuator after the gradual reduction control of the turning output torque performed by the turning control unit. The steering control unit is configured to cut an energization to the steering actuator after the gradual reduction control of the turning output torque performed by the turning control unit.

A second aspect of the present disclosure is a steering control method for a vehicle for controlling and linking a movement of a steering member by a steering actuator with a movement of a turning tire by a turning actuator. The steering control method includes: controlling an actual steering angle of the steering member by controlling a steering output torque output from the steering actuator; and controlling an actual turning angle of the turning tire by controlling a turning output torque output from the turning actuator. In the controlling the actual turning angle, a gradual reduction control is performed to gradually decrease the turning output torque during a linked control in which the actual steering angle is controlled in conjunction with the actual turning angle in response to a stop instruction of the vehicle. In the controlling the actual turning angle, an energization to the turning actuator is cut after the gradual reduction control of the turning output torque. In the controlling the actual steering angle, an energization to the steering actuator is cut after the gradual reduction control of the turning output torque.

A third aspect of the present disclosure is a computer program product for a vehicle for controlling and linking a movement of a steering member by a steering actuator with a movement of a turning tire by a turning actuator. The computer program product is stored on at least one non-transitory computer readable medium and includes instructions configured to, when executed by at least one processor, cause the at least one processor to: control an actual steering angle of the steering member by controlling a steering output torque output from the steering actuator; and control an actual turning angle of the turning tire by controlling a turning output torque output from the turning actuator. In the controlling the actual turning angle, a gradual reduction control is performed to gradually decrease the turning output torque during a linked control in which the actual steering angle is controlled in conjunction with the actual turning angle in response to a stop instruction of the vehicle. In the controlling the actual turning angle, an energization to the turning actuator is cut after the gradual reduction control of the turning output torque. In the controlling the actual steering angle, an energization to the steering actuator is cut after the gradual reduction control of the turning output torque.

EMBODIMENTS

Comparative Example

In a comparative example of the present disclosure, the turning angle of the turning tire is controlled by the turning torque output to the turning tire via the electric actuator. In the comparative example, the lock device limits the rotation of the turning tire in a locking state. The lock device is configured to be in the locking state before the power is off in response to the stop instruction of the vehicle, and release the locking state in response to the start instruction of the vehicle.

However, in the comparative example, if the turning tire is twisted when the energization to the electric actuator is cut by turning off the power in response to the stop instruction of the vehicle, the restoring force in the turning tire caused by the twist continues to act on the locking device. Therefore, there is a concern that the components from the turning tires to the electric actuator and the locking device may shorten their lives.

In contrast, if the locking device does not work in response to the stop instruction of the vehicle, the service life can be secured. However, in this case, the torque output to the turning tire via the electric actuator suddenly disappears in response to the cutoff of power to the electric actuator. As a result, the turning tire is rapidly restored to eliminate the twist, and accordingly the turning tire and chassis of the vehicle supporting the turning tire vibrate. Further, when the locking device is not working, the steering member to which the vibration of the turning tire propagates also vibrate.

Hereinafter, embodiments will be described with reference to the drawings. In the following description, the same reference symbols are assigned to corresponding components in each embodiment in order to avoid repetitive descriptions. When only a part of the configuration is described in the respective embodiments, the configuration of the other embodiments described before may be applied to other parts of the configuration. Further, not only the combinations of the configurations explicitly shown in the description of the respective embodiments, but also the configurations of the plurality of embodiments can be partially combined together even if the configurations are not explicitly shown if there is no problem in the combination in particular.

First Embodiment

Figure 1:
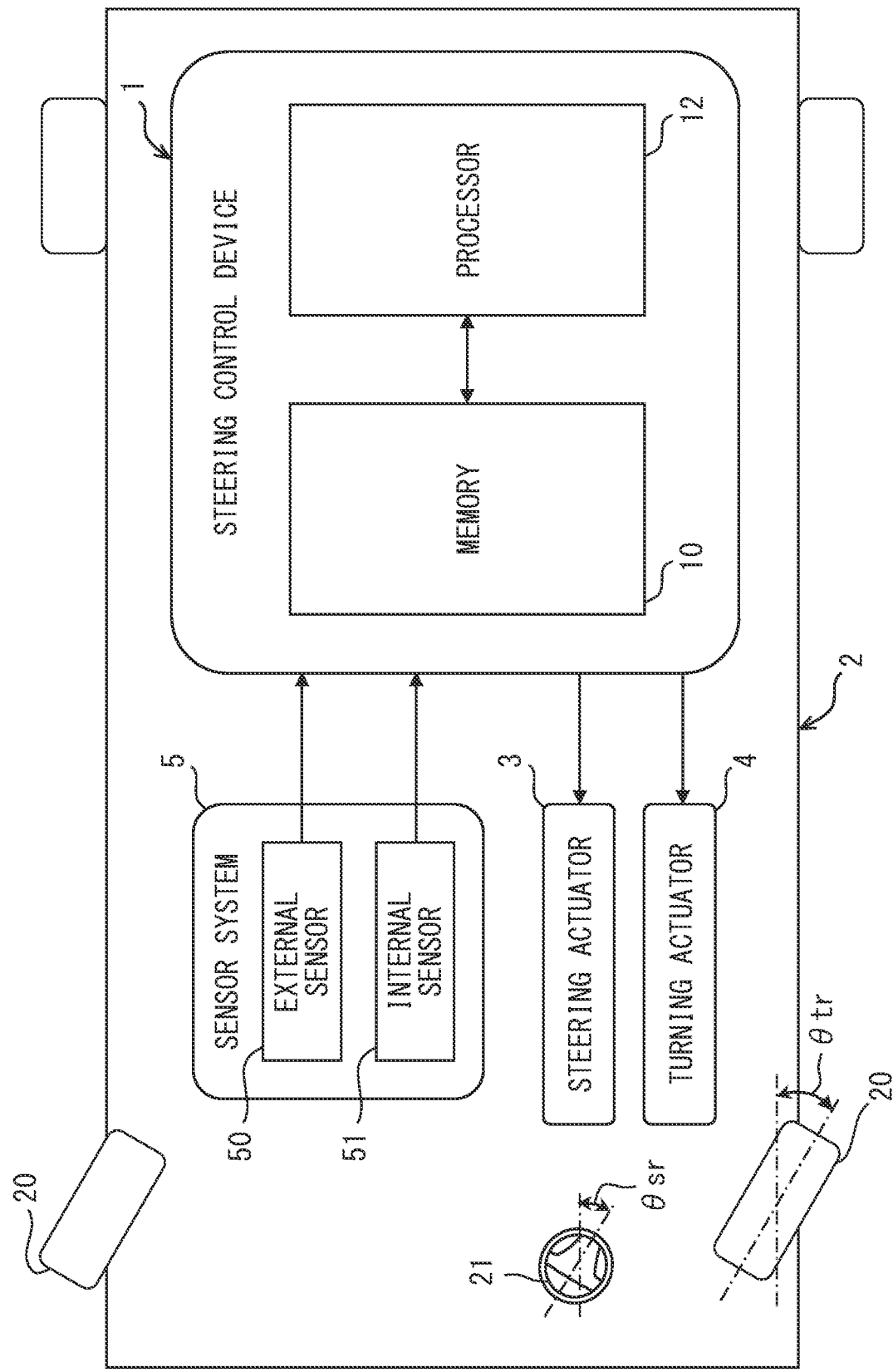
FIG. 1 is a schematic diagram showing a vehicle equipped with a steering control device according to a first embodiment.

As shown in FIG. 1, a steering control device 1 according to a first embodiment is mounted in a vehicle 2. The vehicle 2 is capable of executing a constant or temporary autonomous driving in an automated driving mode. Here, the automated driving mode may be achieved with an autonomous operation control, such as conditional driving automation, advanced driving automation, or full driving automation, where the system in operation performs all driving tasks. The automated driving mode may be achieved with an advanced driving assistance control, such as driving assistance or partial driving automation, where the occupant performs some or all driving tasks. The automated driving mode may be achieved by combining or switching between the autonomous driving control and the advanced driver assistance control.

Figure 2:
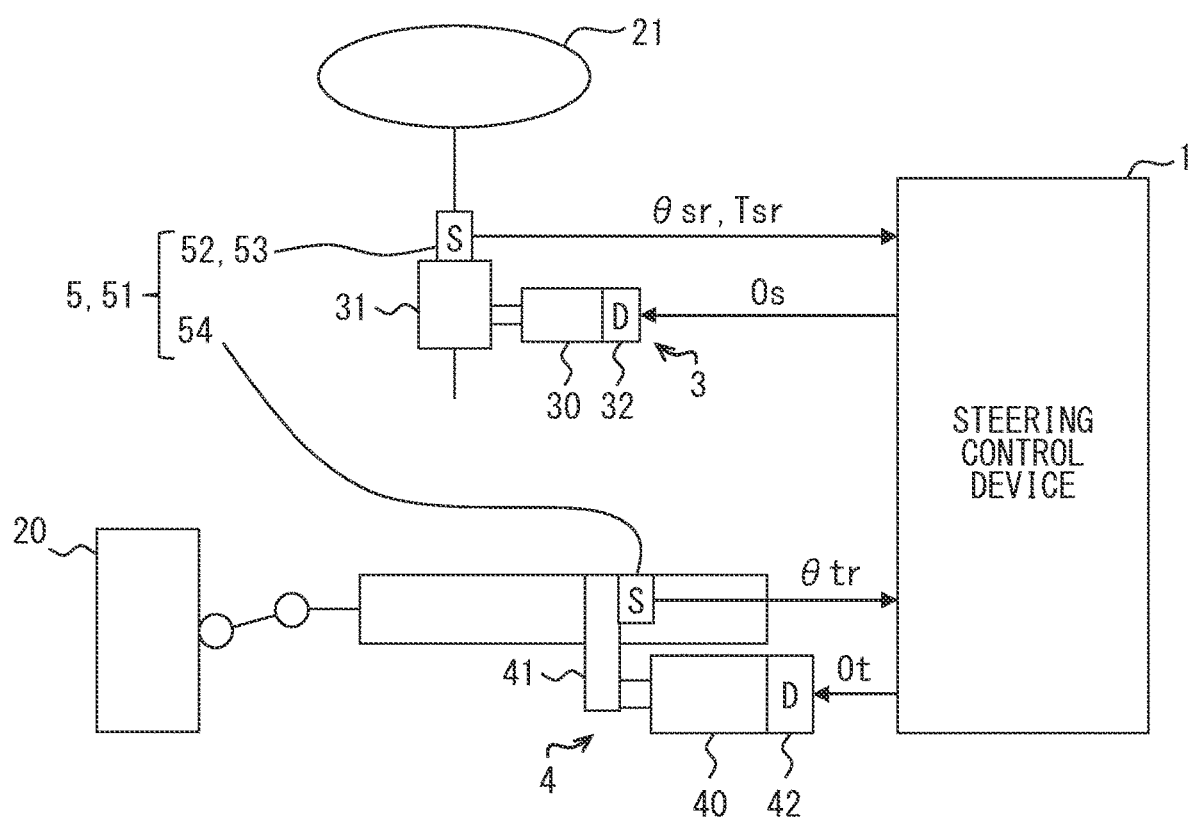
FIG. 2 is a schematic diagram showing the overall configuration of the steering control device according to the first embodiment.
Figure 3:
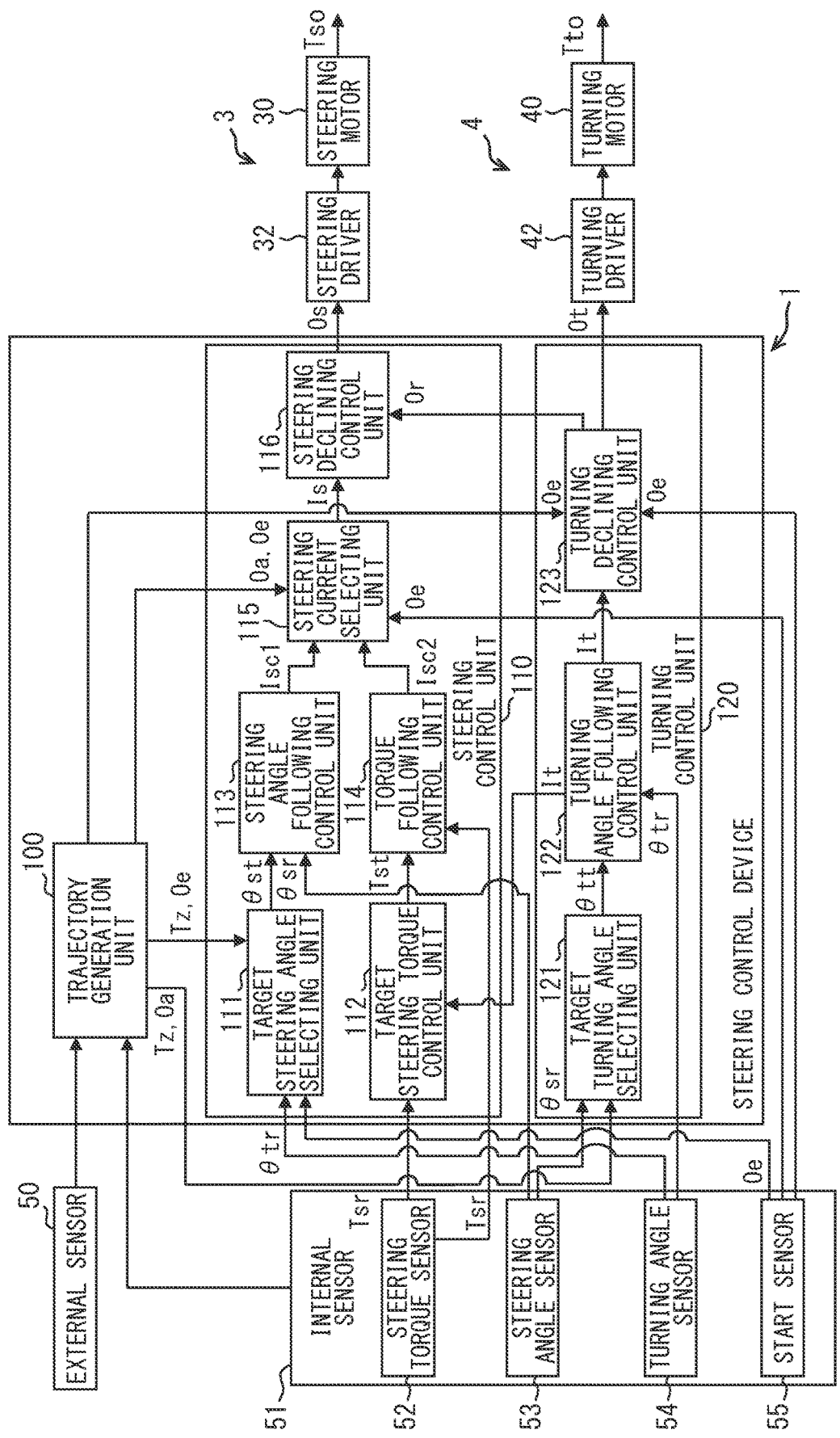
FIG. 3 is a block diagram showing a detail configuration of the steering control device according to the first embodiment.

At least one pair of turning tires 20 among the wheels of the vehicle 2 can be turned under the control of the steering control device 1. A steering wheel 21, which is a steering member of the vehicle 2, can be held by an occupant in the vehicle compartment. A steering actuator 3, a turning actuator 4, and a sensor system 5 are mounted on the vehicle 2 together with the steering control device 1. As shown in FIGS. 2 and 3, the steering actuator 3 includes a steering motor 30, a steering speed reducer 31 and a steering driver 32. The steering actuator 3 is mechanically associated with the steering wheel 21 of the vehicle 2.

The steering actuator 3 controls a current applied to an electric steering motor 30 by a steering driver 32 according to an output instruction Os from the steering control device 1. The steering actuator 3 generates a steering torque by the steering motor 30 to which a current is applied. The steering actuator 3 amplifies the steering torque generated by the steering motor 30 using a steering speed reducer 31 such as a planetary gear and then outputs the amplified steering torque. The output steering torque is transmitted from the steering actuator 3 to the steering wheel 21 as a reaction force, so that the actual steering angle θsr (see FIG. 1) of the steering wheel 21 can be changed.

Here, the actual steering angle θsr and its target steering angle θst are given a positive (i.e., plus) value on the right side and a negative (i.e., minus) value on the left side with respect to the front-rear direction of the vehicle 2, respectively. Similarly, the output instruction Os to the steering actuator 3 is given a positive or negative value.

The turning actuator 4 includes a turning motor 40, a turning speed reducer 41 and a turning driver 42. The turning actuator 4 is mechanically linked to the turning tires 20 of the vehicle 2. The turning actuator 4 constitutes a steer-by-wire system that mechanically disconnects and electrically cooperates with the steering wheel 21 and the steering actuator 3.

The turning actuator 4 controls a current applied to an electric turning motor 40 by a turning driver 42 according to an output instruction Ot from the steering control device 1. The turning actuator 4 generates a turning torque by a turning motor 40 to which a current is applied. The turning actuator 4 amplifies the turning torque generated by the turning motor 40 by a turning speed reducer 41 such as a rack gear, and then outputs the amplified turning torque. The output turning torque is transmitted from the turning actuator 4 to the turning tires 20 as driving force, thereby changing the actual turning angle θtr (see FIG. 1) of the turning tires 20.

Here, the actual turning angle θtr and its target turning angle θtt are given a positive (i.e., plus) value on the right side and a negative (i.e., minus) value on the left side with respect to the front-rear direction of the vehicle 2, respectively. Similarly, the output instruction Ot to the turning actuator 4 is given a positive or negative value.

As shown in FIGS. 1 to 3, the sensor system 5 includes an external sensor 50 and an internal sensor 51. The external sensor 50 is configured to acquire information about the outside of the vehicle 2, which is the surrounding environment of the vehicle 2. The external sensor 50 may acquire the external information by detecting an object existing in the outside of the vehicle 2. The external sensor 50 of the detection type is at least one of a camera, a LIDAR (Light Detection and Ranging/Laser Imaging Detection and Ranging), a radar, sonar, and the like, for example. The external sensor 50 may acquire the external information by receiving a signal from an artificial satellite of a GNSS (Global Navigation Satellite System) present in the outside of the vehicle 2 or a signal from a roadside device of ITS (Intelligent Transport Systems). The external sensor 50 of the signal reception type is at least one of, for example, a GNSS receiver, a telematics receiver, and the like.

The internal sensor 51 is configured to acquire information about the inside of the vehicle 2, which is the internal environment of the vehicle 2. The internal sensor 51 may acquire the internal information by detecting a specific motion physical quantity in the inside of the vehicle 3. The physical quantity detection type internal sensor 51 is, for example, a steering torque sensor 52, a steering angle sensor 53, a turning angle sensor 54, a speed sensor, an acceleration sensor, an inertia sensor, a yaw rate sensor, an actuation sensor 55, and the like, and includes at least sensors 52, 53, 54, 55. The steering torque sensor 52 acquires an actual steering torque Tsr applied to the steering wheel 21. Here, the steering angle sensor 53 acquires the actual steering angle θsr of the steering wheel 21. The turning angle sensor 54 acquires the actual turning angle θtr of the turning tires 20. The actuation sensor 55 outputs an actuation instruction of the vehicle 2 in response to switching on an actuation switch by an occupant of the vehicle 2. The actuation sensor 55 outputs a stop instruction Oe of the vehicle 2 in response to switching off the actuation switch by an occupant of the vehicle 2. The actuation sensor 55 outputs an idle reduction instruction and a restart instruction when the vehicle 2 is in the idle reduction.

The steering control device 1 is connected with the steering actuator 3, the turning actuator 4 and the sensor system 5 through at least one of LAN (Local Area Network), a wire harness, an internal bus, or the like. The steering control device 1 includes at least one dedicated computer. The dedicated computer that constitutes the steering control device 1 may be a driving control ECU (Electronic Control Unit) that implements driving control including an automatic operation mode. The dedicated computer that constitutes the steering control device 1 may be at least one of a steering ECU that controls the steering actuator 3 and a turning ECU that controls the turning actuator 4. The dedicated computer that constitutes the steering control device 1 may be a locator ECU that estimates state quantities of the vehicle 2 including the position of the vehicle 2. The dedicated computer of the steering control device 1 may be a navigation ECU configured to navigate the driver of the vehicle 2. The dedicated computer that constitutes the steering control device 1 may be an HCU (i.e., HMI (i.e., Human Machine Interface) Control Unit) that controls information presentation of the vehicle 2.

As shown in FIG. 1, the steering control device 1 includes at least one memory 10 and at least one processor 12 by including such a dedicated computer. The memory 10 is at least one type of non-transitory tangible storage medium, such as a semiconductor memory, a magnetic storage medium, and an optical storage medium, for non-transitory storage of computer readable programs and data. The processor 12 includes, as a core, at least one type of, for example, a CPU (Central Processing Unit), a GPU (Graphics Processing Unit), an RISC (Reduced Instruction Set Computer) CPU, and the like.

The processor 12 executes multiple instructions included in a steering control program stored in the memory 10. Accordingly, the steering control device 1 provides a plurality of functional units, which are functional blocks for interlocking steering and turning in the vehicle 2 by a control, as shown in FIG. 3. As described above, in the steering control device 1, the processor 12 executes a plurality of instructions according to the steering control program stored in the memory 10 so that multiple functional units are established in order to control the steering and turning of the vehicle 2 in conjunction with each other. These multiple functional units include a trajectory generation unit 100, a steering control unit 110, and a turning control unit 120.

The trajectory generation unit 100 generates the planned trajectory Tz based on input information from the sensor system 5 or physical information based thereon. The planned trajectory Tz indicates a traveling route that defines the time-series change of the state quantity (self-state quantity) of the vehicle 2. The self-state quantity is a physical quantity including at least the position of the vehicle 2. Such a self-state quantity may include, for example, at least one of traveling speed, acceleration, yaw angle, and the like in addition to the position.

The trajectory generation unit 100 is configured to generate control instructions for requests to the steering control unit 110 and the turning control unit 120. Specifically, the trajectory generation unit 100 is configured to generate an automated driving instruction Oa for performing the automated driving mode as the driving control of the vehicle 2. The trajectory generation unit 100 is configured to generate the stop instruction Oe for performing the stop control mode as the driving control of the vehicle 2 in which the vehicle 2 is stopped in the automated driving mode. The stop instruction Oe in the automated driving mode is at least one of a complete stop instruction of the vehicle 2, an idle reduction instruction of the vehicle 2, and a power stop instruction of the actuators 3, 4. The trajectory generation unit 100 may output the stop instruction Oe immediately before a scheduled time determined by the trajectory generation unit 100 for stopping the vehicle 2, on the scheduled time, or immediately after the scheduled time. In contrast, when the driving control of the vehicle 2 is a manual driving mode, the stop instruction Oe for performing the stop control mode is output from the actuation sensor 55. The stop instruction Oe in the manual driving mode is at least one of a complete stop instruction of the vehicle 2 according to the switching off operation of the actuation switch, and an idle reduction instruction of the vehicle 2.

The steering control unit 110 is configured to selectively perform a control of a steering output torque Tso output from the steering actuator 3, a control of the actual steering angle θsr through the steering actuator 3, and a control of the actual steering torque through the steering actuator 3. For this purpose, the steering control unit 110 includes, as sub-functional units, a target steering angle selecting unit 111, a target steering torque control unit 112, a steering angle following control unit 113, a torque following control unit 114, a steering current selecting unit 115, and a steering declining control unit 116.

The stop instruction Oe and the planned trajectory Tz are input to the target steering angle selecting unit 111 from the trajectory generation unit 100. The stop instruction Oe is input to the target steering angle selecting unit 111 from the actuation sensor 55. The actual turning angle θtr is input to the target steering angle selecting unit 111 from the turning angle sensor 54. The target steering angle selecting unit 111 is configured to select, based on these inputs, the target steering angle θst that is the control target of the actual steering angle θsr.

Specifically, when the stop instruction Oe is not input from the trajectory generation unit 100 and the actuation sensor 55, the target steering angle selecting unit 111 selects the target steering angle θst acquired to follow the planned trajectory Tz. In contrast, when the stop instruction Oe is input from the trajectory generation unit 100 or the actuation sensor 55, the target steering angle selecting unit 111 performs a linked control in which the actual steering angle θsr changes in conjunction with the actual turning angle θtr. In the linked control, the target steering angle selecting unit 111 selects, as the target steering angle θst, a converted angle that is calculated by multiplying the actual turning angle θtr by a predetermined conversion ratio.

The target steering angle θst is input to the steering angle following control unit 113 from the target steering angle selecting unit 111. The steering angle following control unit 113 executes steering angle following control such as PID control to make the actual steering angle θsr follow the target steering angle θst. As a result of the steering angle following control, the steering angle following control unit 113 determines, as a first steering current candidate value Isc1, a candidate value of a steering current applied to the steering motor 30.

Figure 4:
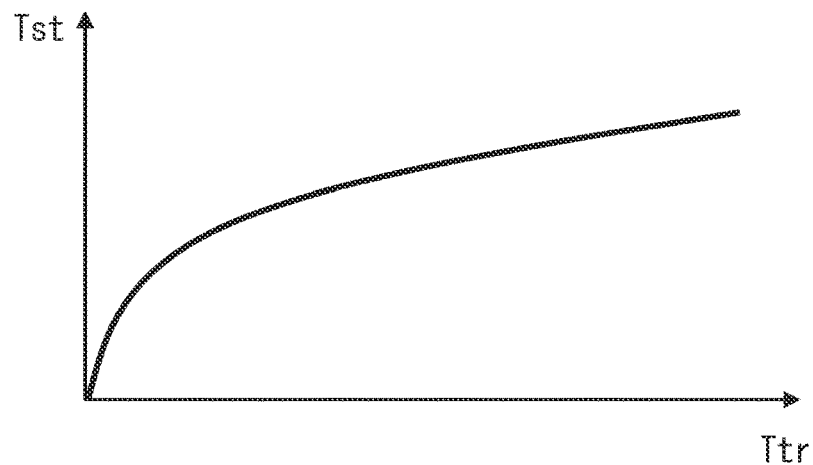
FIG. 4 is a graph for explaining the steering control unit according to the first embodiment.

The actual steering torque Tsr is input from the steering torque sensor 52 to the target steering torque control unit 112, and a turning current value It is input from a turning angle following control unit 122 of the turning control unit 120 to the target steering torque control unit 112. The target steering torque control unit 112 is configured to estimate an actual turning torque Ttr applied on the turning tire 20 based on the actual steering torque Tsr and a value calculated by multiplying the turning current value It by a predetermined torque conversion coefficient. The target steering torque control unit 112 is configured to determine a target steering torque Tst corresponding to the estimated actual turning torque Ttr based on a map shown in FIG. 4, for example.

As shown in FIG. 3, the target steering torque Tst is input from the target steering torque control unit 112 to the torque following control unit 114. The actual steering torque Tsr is input from the steering torque sensor 52 to the torque following control unit 114. The torque following control unit 114 executes torque following control such as PID control to make the actual steering torque Tsr follow the target steering torque Tst. As a result of the torque following control, the torque following control unit 114 determines, as a second steering current candidate value Isc2, a candidate value of a steering current applied to the steering motor 30.

The stop instruction Oe and the automated driving instruction Oa are input from the trajectory generation unit 100 to the steering current selecting unit 115. The stop instruction Oe is input to the steering current selecting unit 115 from the actuation sensor 55. The first steering current candidate value Isc1 is input from the steering angle following control unit 113 to the steering current selecting unit 115. The second steering current candidate value Isc2 is input from the torque following control unit 114. The steering current selecting unit 115 is configured to select, as a steering current value Is, one of the first steering current candidate value Isc1 and the second steering current candidate value Isc2 depending of the mode.

Specifically, the steering current selecting unit 115 selects the first steering current candidate value Isc1 as the steering current value Is when the automated driving instruction Oa is input from the trajectory generation unit 100. Further, the steering current selecting unit 115 selects the first steering current candidate value Isc1 as the steering current value Is when the stop instruction Oe is input from the trajectory generation unit 100 or the actuation sensor 55. Accordingly, in the automated driving mode and the stop control mode of the vehicle 2, the first steering current candidate value Isc1 is selected as the steering current value Is.

In contrast, the steering current selecting unit 115 selects the second steering current candidate value Isc2 as the steering current value Is when on one of the automated driving instruction Oa and the stop instruction Oe is input. Accordingly, in the manual driving mode of the vehicle 2, the second steering current candidate value Isc2 is selected as the steering current value Is.

The steering current value Is is input from the steering current selecting unit 115 to the steering declining control unit 116. The steering declining instruction Or is input from the turning declining control unit 123 of the turning control unit 120 to the steering declining control unit 116. When the steering declining instruction Or is not input, the steering declining control unit 116 generates the output instruction Os to instruct the steering actuator 3 to apply the steering current value Is. As a result, when the steering current value Is is the first steering current candidate value Isc1, the actual steering angle θsr of the steering wheel 21 is controlled to be an angle corresponding to the output instruction Os through the steering actuator 3 that works based on the generated output instruction Os. In contrast, when the steering current value Is is the second steering current candidate value Isc2, the actual steering torque Tsr of the steering wheel 21 is controlled to be an angle corresponding to the output instruction Os through the steering actuator 3 that works based on the generated output instruction Os.

Further, when the steering declining instruction Or is input, the steering declining control unit 116 generates the output instruction Os for instructing the steering actuator 3 to apply the current value adjusted by the gradual reduction control. As a result, the steering actuator 3 that works depending on the generated output instruction Os controls the steering output torque Tso for the steering wheel 21.

As shown in FIG. 3, the turning control unit 120 is configured to selectively perform the control of the turning output torque Tto output from the turning actuator 4 and the control of the actual turning angle θtr through the turning actuator 4. The turning control unit 120 includes a target turning angle selecting unit 121, a turning angle following control unit 122, and a turning declining control unit 123.

The automated driving instruction Oa and the planned trajectory Tz are input to the target turning angle selecting unit 121 from the trajectory generation unit 100. The actual steering angle θsr is input to the target turning angle selecting unit 121 from the steering angle sensor 53. The target turning angle selecting unit 121 is configured to select, based on these inputs, the target turning angle θtt that is the control target for the actual turning angle θtr.

Specifically, when the automated driving instruction Oa is input from the trajectory generation unit 100, the target turning angle selecting unit 121 selects the target turning angle θtt acquired to follow the planned trajectory Tz. In contrast, when the automated driving instruction Oa is not input from the trajectory generation unit 100, the target turning angle selecting unit 121 performs the linked control in which the actual turning angle θtr changes in conjunction with the actual steering angle θsr. In the linked control, the target turning angle selecting unit 121 selects, as the target turning angle θtt, a converted angle that is calculated by multiplying the actual steering angle θsr by a predetermined conversion ratio.

The target turning angle θtt is input to the turning angle following control unit 122 from the target turning angle selecting unit 121. The turning angle following control unit 122 executes turning angle following control such as PID control to make the actual turning angle θtr follow the target turning angle θtt. As a result of the steering angle following control, the turning angle following control unit 122 determines the turning current value It applied to the turning motor 40.

The turning current value It is input from the turning angle following control unit 122 to the turning declining control unit 123. The stop instruction Oe is input from the trajectory generation unit 100 to the turning declining control unit 123. The stop instruction is input from the actuation sensor 55 to the turning declining control unit 123. When the stop instruction Oe is not input, the turning declining control unit 123 generates the output instruction Ot to instruct the turning actuator 4 to apply the turning current value It. As a result, the actual turning angle θtr of the turning tire 20 is controlled to be an angle corresponding to the output instruction Ot by the turning actuator 4 works depending on the generated output instruction Ot.

In contrast, when the stop instruction Oe is input, the turning declining control unit 123 generates the output instruction Ot for instructing the turning actuator 4 to apply the current value adjusted by the gradual reduction control. As a result, the turning actuator 4 that works depending on the generated output instruction Ot controls the turning output torque Tto for the turning tire 20. The steering output torque Tto substantially matches the actual turning torque Ttr of the turning tire 20.

The flow of the method performed in the stop control mode in the steering control method for controlling to link the steering and turning of the vehicle 2 by the trajectory generation unit 100, the steering control unit 110, and the turning control unit 120 will be described with reference to FIGS. 5-7. This flow is started in response to the stop instruction Oe from one of the trajectory generation unit 100 and the actuation sensor 55. Further, in FIG. 5, "S" means steps of the process executed by instructions included in the steering control program. In FIG. 6, except for the graph of the stop instruction Oe, the change over time of the value related to turning is illustrated by a solid line, and the change over time of the value related to steering is illustrated by a dotted line.

Figure 5:
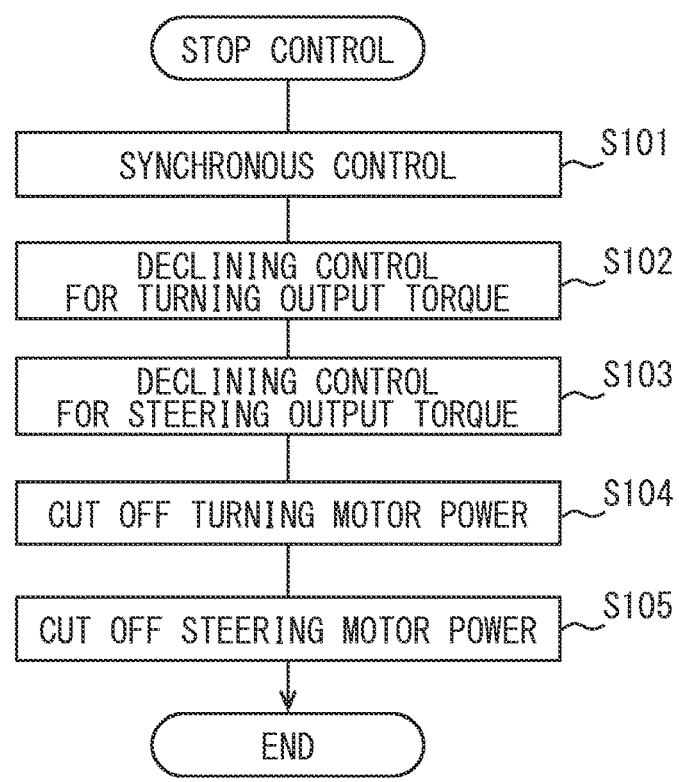
FIG. 5 is a flowchart illustrating the steering control method according to the first embodiment.
Figure 6:
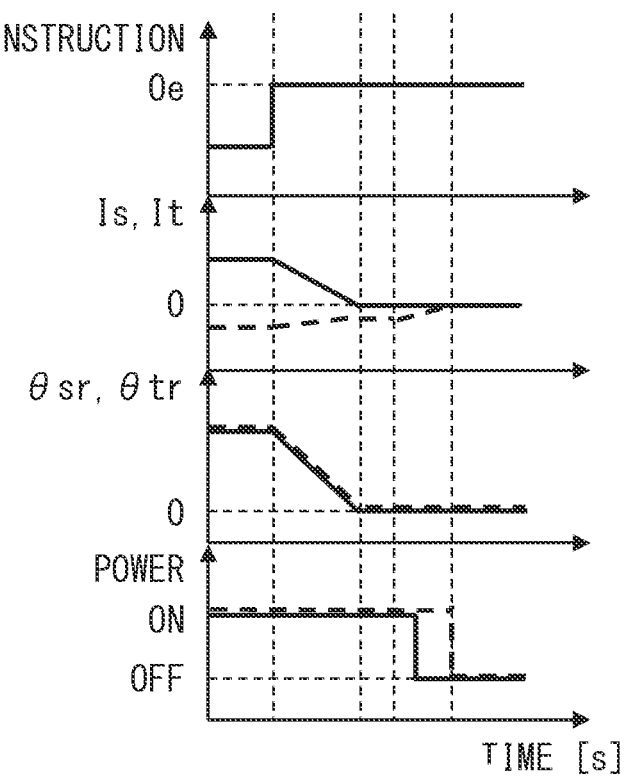
FIG. 6 is a graph showing a stop control mode according to the first embodiment.

In S101 of FIG. 5, the target steering angle selecting unit 111 selects, in response to the stop instruction Oe, the target steering angle θst such that the actual steering angle θsr changes together with the actual turning angle θtr. As a result, the selected target steering angle θst is converted by the steering angle following control unit 113 into the first steering current candidate value Isc1, and the converted value Isc1 is input from the steering current selecting unit 115 to the steering declining control unit 116 as the steering current value Is in response to the stop instruction Oe. Therefore, the output instruction Os instructing the steering current value Is is output, and accordingly the actual steering angle θsr is controlled in conjunction with the actual turning angle θtr as shown in FIG. 6. The linked control stating in S101 continues until S103 starts. Accordingly, S102 is performed during the linked control.

Figure 7:
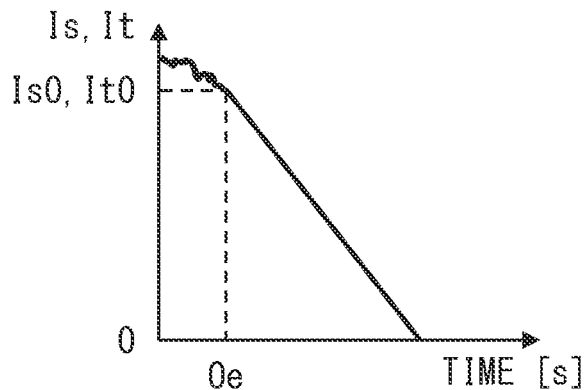
FIG. 7 is a graph showing a gradual reduction control according to the first embodiment.

As shown in FIG. 5, in S102, the turning declining control unit 123 gradually decreases the turning current value It as shown in FIGS. 6, 7. The turning declining control unit 123 stores the turning current value It, as an initial value It0 which is to be gradually decreased, at the time when the stop instruction Oe is input. The turning declining control unit 123 substantially continuously decreases the turning current value It from the initial value It0 such that the rate of decrease of the turning current value It per unit time is constant. The turning declining control unit 123 outputs, to the turning actuator 4, the output instruction Ot that instructs the decrease of the turning current value It. According to this, the turning output torque Tto output from the turning actuator 4 to the turning tire 20 is controlled according to the output instruction Ot to gradually decrease such that the rate of decrease per unit time is constant. As a result of the above, when the turning current value It reaches 0, the turning declining control unit 123 terminates the gradual decrease of the turning current value It, and then outputs the steering declining instruction Or to the steering declining control unit 116. The gradual decrease of the turning current value It may be terminated when the turning current value It reaches a predetermined value close to 0.

As shown in FIG. 5, in S103, the steering declining control unit 116 performs the gradual decrease of the steering current value Is shown in FIGS. 6, 7 in response to the steering declining instruction Or after the gradual reduction control of the turning current value It by the turning declining control unit 123 ends. The steering declining control unit 116 stores, as an initial value Is0 of the steering current value Is which is to be gradually decreased, the steering current value Is at the time when the steering declining instruction Or is input. The steering declining control unit 116 substantially continuously decreases the steering current value Is from the initial value Is0 such that the rate of decrease of the steering current value Is0 per unit time is constant. The steering declining control unit 116 outputs, to the steering actuator 3, the output instruction Os that instructs the decrease of the steering current value Is. According to this, the steering output torque Tso output from the steering actuator 3 to the steering wheel 21 is controlled according to the output instruction Os to gradually decrease such that the rate of decrease per unit time is constant. As a result of the above, the steering declining control unit 116 terminates the gradual decrease of the steering current value Is when the steering current value Is reaches 0. The gradual decrease of the steering current value Is may be terminated when the steering current value Is reaches a predetermined value close to 0.

As shown in FIG. 5, after the gradual reduction control of the steering current value Is by the 116 ends, the turning declining control unit 123 cuts the energization from the turning driver 42 to the turning motor 40 in S104. Further, after the gradual reduction control of the steering current value Is by the 116 ends, the steering declining control unit 116 cuts the energization from the steering driver 32 to the steering motor 30 in S105. The timings of S104 in which the energization to the steering motor 30 is cut and S105 in which the energization to the turning motor 40 is cut may offset (in FIGS. 5, 6, S104 is performed first), and may be substantially the same. In the present embodiment shown in FIG. 6, the cut of the energization of the steering motor 30 and the cut of the energization of the turning motor 40 are realized by shutting down (turning off, in FIG. 6) power by the corresponding driver 32, 42. However, when the applied current is decreased to 0 in S102, S103, the cut of the energization is realized when the current reaches 0.

In the present embodiment, S101, S103, S105 correspond to a steering control step, and S102, S104 correspond to a turning control step.

Operation Effect

The operation and effects of the first embodiment described above will be described below.

According to the first embodiment, during the linked control in which the actual steering angle θsr is controlled in conjunction with the actual turning angle θtr in response to the stop instruction Oe of the vehicle 2, the turning output torque Tto output from the turning actuator 4 is controlled to gradually decrease, and then the energization to the turning actuator 4 and the steering actuator 3 is cut. According to this, the twist of the turning tire 20 is gradually eliminated according to the gradual reduction control of the turning output torque Tto before the energization to the turning actuator 4 and the steering actuator 3 is cut, and accordingly the turning tire 20 is limited from sudden restoration. Accordingly, the vibration of the turning tire 20 and the vehicle chassis supporting the turning tire 20 due to the restoration of the turning tire 20 can be suppressed in response to the stop instruction Oe. Further, since the gradual reduction control of the turning tire Tto is performed during the linked control of the actual steering angle θsr and the actual turning angle θtr, the vibration of the steering wheel 21 which moves in conjunction with the turning tire 20 can be suppressed in response to the stop instruction Oe.

In the first embodiment, the turning output torque Tto can be controlled to gradually decrease by the gradual decrease of the current to the turning actuator 4. Accordingly, the vibration of the vehicle 2 due to the sudden restoration of the turning tire 20 can be suppressed in response to the stop instruction of the vehicle 2.

In the first embodiment, the current to the turning actuator 4 is decreased to 0, and thus the turning output torque Tto is also decreased to 0. Accordingly, the gradual elimination of the twist of the turning tire 20 can be continued until the turning output torque Tto becomes zero, thereby the vibration can be further suppressed in response to the stop instruction of the vehicle.

In the first embodiment, the energization of the turning actuator 4 and the steering actuator 3 is cut after the steering output torque Tso from the steering actuator 3 is controlled to be gradually decreased. According to this, even when the steering output torque Tso remains after the linked control of the actual steering angle sr and the actual turning angle θtr, the movement and vibration of the steering wheel 21 due to the remaining torque Tso can be suppressed by the gradual change of the torque according to the gradual decrease. Therefore, it is possible to suppress the steering wheel 21 from hindering the effect of suppressing the vibration in response to the stop command Oe of the vehicle 2.

In the first embodiment, the steering output torque Tso can be controlled to gradually decrease by the gradual decrease of the current to the steering actuator 3. Therefore, it is possible to suppress the steering wheel 21 from hindering the effect of suppressing the vibration in response to the stop command Oe of the vehicle 2.

In the first embodiment, the current to the steering actuator 3 is decreased to 0, and thus the steering output torque Tso is also decreased to 0. Accordingly, the steering output torque Tso can be gradually decreased to be zero, and thus it is possible to suppress the vibration in response to the stop instruction Oe of the vehicle 2.

In the first embodiment, the energization of the turning actuator 4 and the steering actuator 3 is cut by shutting down the power after the gradual reduction control of the turning output torque Tto and the steering output torque Tso. According to this, the vibration of the turning tire 20 and the vehicle chassis due to the restoration of the turning tire 20 can be suppressed by the power shutdown in response to the stop instruction Oe.

Second Embodiment

Figure 8:
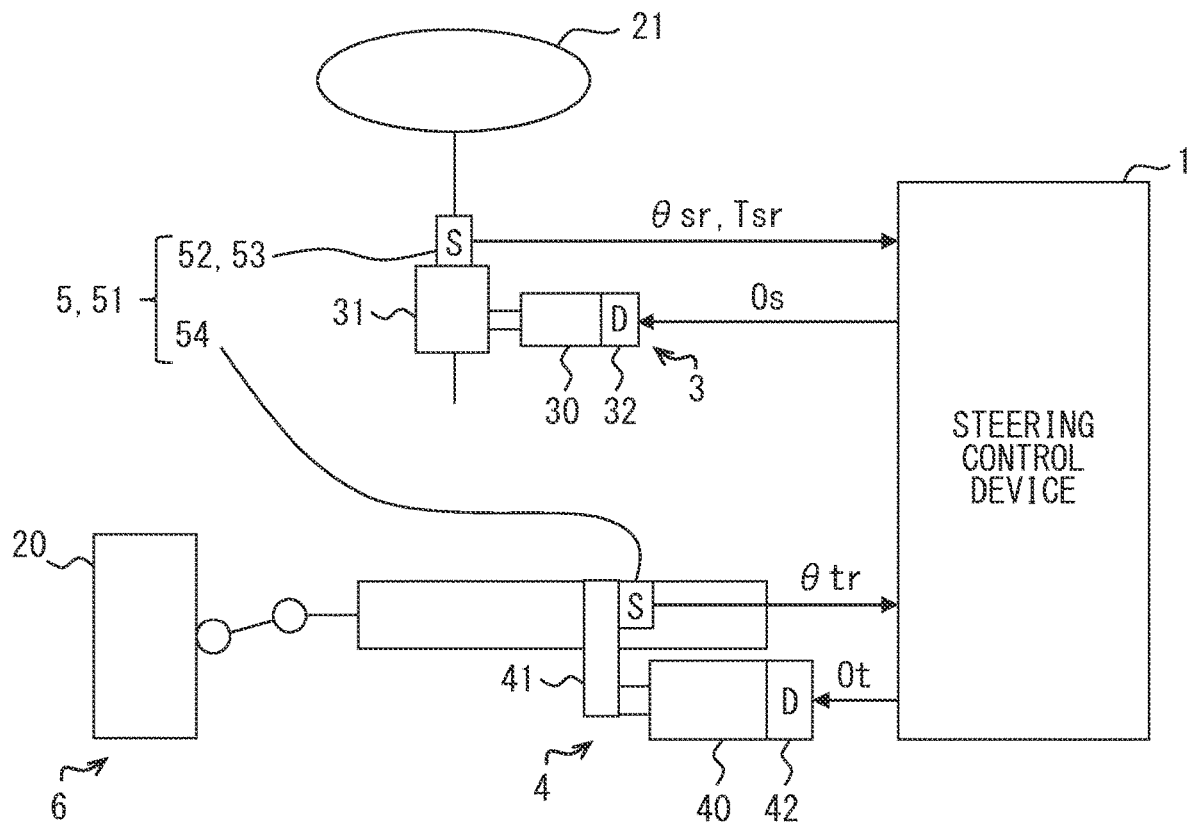
FIG. 8 is a schematic diagram showing a vehicle equipped with a steering control device according to a second embodiment.
Figure 9:
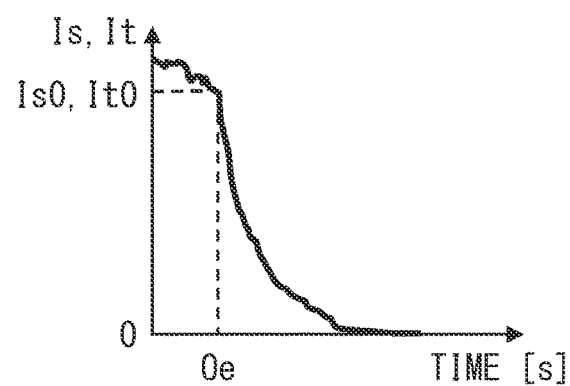
FIG. 9 is a graph showing a gradual reduction control according to the second embodiment.

A second embodiment shown in FIGS. 8, 9 is a modification of the first embodiment. In the second embodiment, the configurations of the turning declining control unit 123 and the steering declining control unit 116 are different from the first embodiment.

The turning declining control unit 123 of the second embodiment includes a low-pass filter whose cutoff frequency is lower than the resonance frequency of a turning system 6 shown in FIG. 8. The turning system 6 includes at least the turning tire 20 of the vehicle 2. The turning system 6 may include the turning actuator 4. The turning system 6 may include actuation members such as a tire rod located between the turning actuator 4 and the turning tire 20. The turning declining control unit 123 is configured to gradually decrease the turning current value It by the low-pass filter. Accordingly, in addition to the turning current value It, the decrease rate per unit time of the turning current value It is also gradually reduced as shown in FIG. 9.

The steering declining control unit 116 of the second embodiment includes the low-pass filter having a predetermined cutoff frequency. The steering declining control unit 116 is configured to gradually decrease the steering current value Is by the low-pass filter. Accordingly, in addition to the steering current value Is, the decrease rate per unit time of the steering current value Is is also gradually reduced as shown in FIG. 9.

Operation Effect

The operation and effect of the second embodiment described above will be described below.

In the second embodiment, the current applied to the turning actuator 4 is gradually decreased by using the low-pass filter whose cutoff frequency is lower than the resonance frequency of the turning system 6 including the turning tire 20 of the vehicle 2. According to this, the vibration of the turning system 6 and the vehicle chassis due to the restoration of the turning tire 20 can be suppressed in response to the stop instruction Oe.

OTHER EMBODIMENTS

While some embodiments of the present disclosure have been described above, the present disclosure should not be interpreted to be limited to these embodiments, and can be applied to various other embodiments and combinations thereof without departing from the scope of the subject matter of the present disclosure.

The turning actuator 4 of the modified example may constitute a power steering system that is mechanically linked to the steering wheel 21 and the steering actuator 3 and is controllable independently of the actuator 3.

The dedicated computer of the steering control device 1 in a modification example may be at least one outside center computer communicating with the vehicle 2. The dedicated computer of the steering control device 1 of the modification example may include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

In a modification example of the first and second embodiments, the turning current value It may be intermittently decreased instead of continuously being decreased. In a modification example of the first and second embodiments, the steering current value Is may be intermittently decreased instead of continuously being decreased.

In a modification example of the second embodiment, the turning current value It may be gradually decreased such that the decrease rate gradually increases, instead of gradually decreasing such that decrease rate per unit time gradually decreases. In a modification example of the second embodiment, the steering current value Is may be gradually decreased such that the decrease rate gradually increases, instead of gradually decreasing such that decrease rate per unit time gradually decreases.

In a modification, the first embodiment and the second embodiment may be combined. Specifically, only one of the turning declining control unit 123 and the steering declining control unit 116 may decrease the current by the low-pass filter as in the second embodiment.

What is claimed is:

1. A steering control device of a vehicle for controlling and linking a movement of a steering member by a steering actuator with a movement of a turning tire by a turning actuator, the steering control device comprising:

a steering control unit configured to control an actual steering angle of the steering member by controlling a steering output torque output from the steering actuator; and a turning control unit configured to control an actual turning angle of the turning tire by controlling a turning output torque output from the turning actuator, wherein the turning control unit is configured to perform a gradual reduction control to gradually decrease the turning output torque during a linked control in which the steering control unit controls the actual steering angle in conjunction with the actual turning angle in response to a stop instruction of the vehicle, the turning control unit is configured to cut an energization to the turning actuator after the gradual reduction control of the turning output torque performed by the turning control unit, and the steering control unit is configured to cut an energization to the steering actuator after the gradual reduction control of the turning output torque performed by the turning control unit, wherein the turning control unit is configured to perform the gradual reduction control of the turning output torque by gradually decreasing a current applied to the turning actuator, and the turning control unit is configured to gradually decrease the current applied to the turning actuator by a low-pass filter whose cutoff frequency is lower than a resonance frequency of a turning system that includes the turning tire of the vehicle.

2. The steering control device according to claim 1, wherein the turning control unit is configured to gradually decrease the current applied to the turning actuator to zero.

3. The steering control device according to claim 1, wherein the turning control unit is configured to cut the energization to the turning actuator after a gradual reduction control of the steering output torque performed by the steering control unit to gradually decrease the steering output torque, and the steering control unit is configured to cut the energization to the steering actuator after the gradual reduction control of the steering output torque performed by the steering control unit.

4. The steering control device according to claim 3, wherein the steering control unit is configured to perform the gradual reduction control of the steering output torque by gradually decreasing a current applied to the steering actuator.

5. The steering control device according to claim 4, wherein the steering control unit is configured to gradually decrease the current applied to the steering actuator to zero.

6. The steering control device according to claim 1, wherein the turning control unit is configured to cut the energization to the turning actuator by shutting off power, and the steering control unit is configured to cut the energization to the steering actuator by shutting off power.

7. A steering control method for a vehicle for controlling and linking a movement of a steering member by a steering actuator with a movement of a turning tire by a turning actuator, the steering control method comprising:

controlling an actual steering angle of the steering member by controlling a steering output torque output from the steering actuator; and controlling an actual turning angle of the turning tire by controlling a turning output torque output from the turning actuator, wherein in the controlling the actual turning angle, a gradual reduction control is performed to gradually decrease the turning output torque during a linked control in which the actual steering angle is controlled in conjunction with the actual turning angle in response to a stop instruction of the vehicle, in the controlling the actual turning angle, an energization to the turning actuator is cut after the gradual reduction control of the turning output torque, and in the controlling the actual steering angle, an energization to the steering actuator is cut after the gradual reduction control of the turning output torque, wherein in the controlling the actual turning angle, the gradual reduction control of the turning output torque is performed by gradually decreasing a current applied to the turning actuator, and in the controlling the actual turning angle, the current applied to the turning actuator is gradually decreased by a low-pass filter whose cutoff frequency is lower than a resonance frequency of a turning system that includes the turning tire of the vehicle.

8. The steering control method according to claim 7, wherein in the controlling the actual turning angle, the current applied to the turning actuator is gradually decreased to zero.

9. The steering control method according to claim 7, wherein in the controlling the actual turning angle, the energization to the turning actuator is cut after a gradual reduction control of the steering output torque to gradually decrease the steering output torque, and in the controlling the actual steering angle, the energization to the steering actuator is cut after the gradual reduction control of the steering output torque.

10. The steering control method according to claim 9, wherein in the controlling the actual steering angle, the gradual reduction control of the steering output torque is performed by gradually decreasing a current applied to the steering actuator.

11. The steering control method according to claim 10, wherein in the controlling the actual steering angle, the current applied to the steering actuator is gradually decreased to zero.

12. The steering control method according to claim 7, wherein in the controlling the actual turning angle, the energization to the turning actuator is cut by shutting off power, and in the controlling the actual steering angle, the energization to the steering actuator is cut by shutting off power.

13. A non-transitory computer readable storage medium storing a computer program product for a vehicle for controlling and linking a movement of a steering member by a steering actuator with a movement of a turning tire by a turning actuator, the computer program product comprising instructions configured to, when executed by at least one processor, cause the at least one processor to:
- control an actual steering angle of the steering member by controlling a steering output torque output from the steering actuator; and
- control an actual turning angle of the turning tire by controlling a turning output torque output from the turning actuator, wherein
- in the controlling the actual turning angle, a gradual reduction control is performed to gradually decrease the turning output torque during a linked control in which the actual steering angle is controlled in conjunction with the actual turning angle in response to a stop instruction of the vehicle,
- in the controlling the actual turning angle, an energization to the turning actuator is cut after the gradual reduction control of the turning output torque, and
- in the controlling the actual steering angle, an energization to the steering actuator is cut after the gradual reduction control of the turning output torque, wherein
- the gradual reduction control of the turning output torque is performed by gradually decreasing a current applied to the turning actuator, and
- the current applied to the turning actuator is gradually decreased by a low-pass filter whose cutoff frequency is lower than a resonance frequency of a turning system that includes the turning tire of the vehicle.

* * * * *